United States Patent [15] 3,638,951

Hess, Jr. et al.

[45] Feb. 1, 1972

[54] PHONOGRAPH MOUNTING STRUCTURE

[72] Inventors: James L. Hess, Jr., Moorestown, N.J.; Harrison E. Dow, Wycombe, Pa.

[73] Assignee: Philco-Ford Corporation, Philadelphia, Pa.

[22] Filed: Dec. 22, 1969

[21] Appl. No.: 886,858

[52] U.S. Cl. ..................274/2

[51] Int. Cl. ..................G11b 1/00

[58] Field of Search ..................274/1, 2, 10; 248/22, 350, 248/358; 312/8

[56] References Cited

UNITED STATES PATENTS

| | | | |
|---|---|---|---|
| 3,069,171 | 12/1962 | Brobeck | 274/10 |
| 2,954,234 | 9/1960 | Marks | 274/1 X |
| 2,962,289 | 11/1960 | Greene | 274/10 |
| 2,642,253 | 6/1953 | Markowitz | 248/22 X |
| 2,386,248 | 10/1945 | Marzetti | 248/22 |
| 2,888,267 | 5/1959 | Murro | 274/10 |

*Primary Examiner*—Harry N. Haroian
*Attorney*—Carl H. Synnestvedt

[57] ABSTRACT

A phonograph turntable and record changer apparatus rigidly mounted upon cabinet structure provided with a dust cover. Operating levers for control elements of the apparatus are accessible without removing the cover, since they extend through apertures in the front of the cabinet structure, and the entire structure is resiliently supported upon a base by foamed polyurethane spacer means disposed between confronting peripheral portions of the cabinet structure and its base.

3 Claims, 3 Drawing Figures

INVENTORS
JAMES L. HESS, JR.
HARRISON E. DOW
BY
Harry W. Hargis III
AGENT

PHONOGRAPH MOUNTING STRUCTURE

BACKGROUND OF THE INVENTION

This invention relates to phonographs, and more particularly to improved means for resiliently mounting a phonograph turntable and record changer apparatus.

Modular phonograph record changer and turntable apparatus of one well-known type includes cabinet structure provided with a transparent dust cover for housing the apparatus and the associated operating elements for its controls. Upon each manipulation of these control operating elements, such for example as knobs or levers, it is necessary to remove the dust cover, and replace the same. The controls typically comprise a turntable speed selector mechanism, an on-off-reject mechanism, and a tone arm cueing mechanism. Control operating elements, such as knobs and levers, as well as the controls per se, are mounted on the turntable baseplate, which in turn is resiliently mounted on suitable support structure. Hence, such knobs and levers are subject to the excursions of the baseplate. In order that the cover need not be disturbed, it has become desirable to move the operating elements, in the form of levers, to positions in which they protrude through the front of the support cabinet. However, the substantial excursions of the levers, which move along with the baseplate, have presented difficulties.

The present invention has as its general objective the provision of improved cabinet structure for resiliently supporting phonograph apparatus of the aforementioned type, which structure renders the controls accessible through a wall portion of the cabinet without need for removing an associated dust cover, and also minimizes vibrational excursions of the record changer.

SUMMARY OF THE INVENTION

In achievement of the foregoing as well as other objectives, the invention contemplates phonograph apparatus comprising cabinet structure having a horizontally extending upper wall portion fixed rigidly thereto. Phonograph turntable and record playing mechanism is mounted upon this upper wall portion, and a removable dust cover overlies the mechanism. In especial accordance with the invention, vibrational and hence acoustical isolation of the turntable is achieved by mounting the cabinet structure upon a base by means of a spacer of resilient material, such for example as foamed polyurethane, interposed between confronting peripheral portions of the cabinet structure and its base. Since the resultant phonograph mechanism and cabinet structure are not subject to relative vibrational excursions, the operating elements for the changer and turntable mechanism controls comprise excursion-free lever means arranged to extend through suitable apertures provided on the front of the cabinet. Advantageously, the control operating elements are therefore made accessible without need for removing the dust cover.

The apparatus of the invention has the following additional significant advantage. In the prior art, due to the flexibility of the changer-supporting springs and the low mass of the changer, shocks to which the system might be subjected tended to induce relatively sustained vibrations. The construction of this invention very substantially increases the mass of sprung weight. It does this by adding most of the cabinet weight to that of the changer. In effect there is produced one relatively massive system resiliently supported on a cabinet base or plate. Thus there is achieved not only forwardly accessible controls which do not tend to move with respect to the aperture through which they project, but also a changer and cabinet assembly which is resistant to vibration from external sources.

The manner in which the foregoing, as well as other objectives and advantages of the invention may best be achieved will be more fully understood from a consideration of the following description, taken in light of the accompanying drawing.

DESCRIPTION OF THE PREFERRED EMBODIMENT

Figures 1, 3:
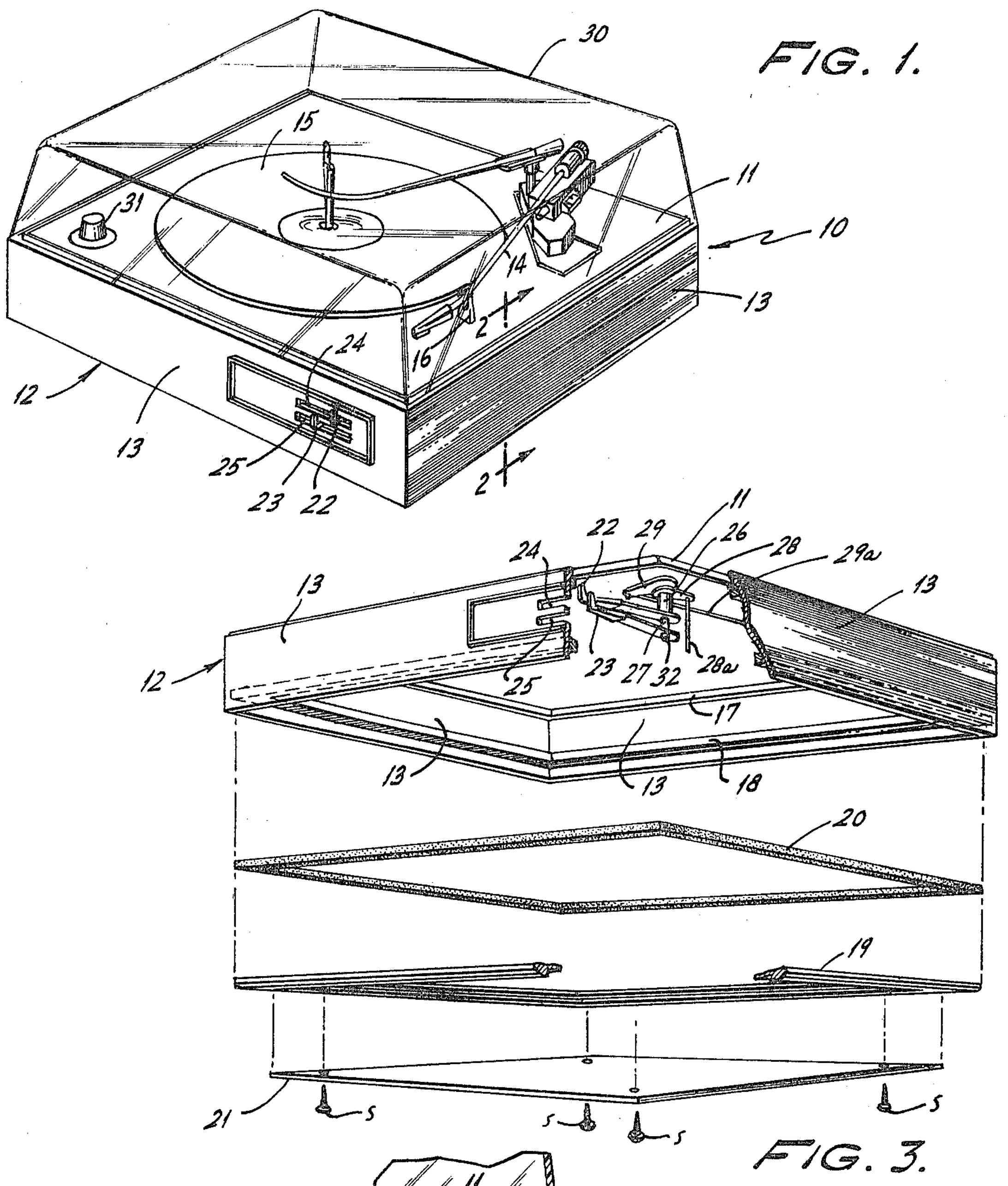
FIG. 1 is a perspective showing of phonograph apparatus embodying the invention.
FIG. 3 is an exploded view of the apparatus seen in FIG. 1, with parts removed and broken away, and further illustrating features of the invention.

With more detailed reference to the drawing, there is shown in FIG. 1 phonograph apparatus 10 of the electrically driven type in which a horizontal baseplate 11 is disposed atop cabinet structure 12 having vertical sidewalls 13 and a dust cover 30. Baseplate 11 extends over substantially the entire top of box-shaped cabinet structure 12, is rigidly affixed thereto by known means (not shown), and supports various parts of the phonograph mechanism including the tone arm 14, the turntable 15, and their control elements to be discussed more fully below. Turntable 15 is rotatably supported on base plate 11 and is adapted to be driven in the usual manner by drive means of a conventional type, such as an electric motor (not shown) on the baseplate. As is customary, tone arm 14 is supported on baseplate 11 to swing both vertically and horizontally for movement into and out of engagement with a record, under control of suitable cycling mechanism (not shown) carried by the baseplate. When the phonograph mechanism is turned off and not in use, tone arm 14 seats on a rest support 16 disposed on the base to one side of turntable 15. Control elements for the motor, as well as the tone arm mechanism, the turntable mechanism, and the changer drive mechanisms associated therewith are conventional, and need not be described in further detail for an understanding of the invention.

Figure 2:
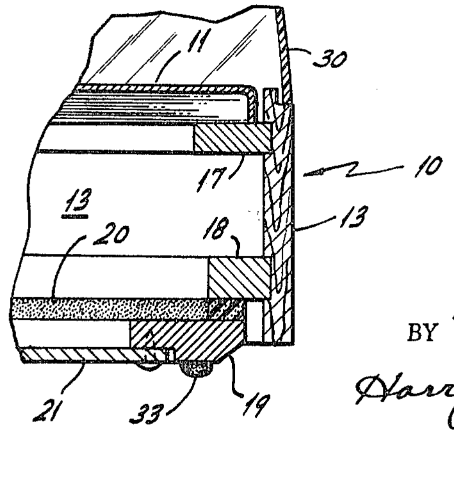
FIG. 2 is a fragmentary sectional showing of the apparatus as seen looking generally in the direction of arrows 2—2 applied to FIG. 1.

In especial accordance with the invention, and with reference also to FIGS. 2 and 3, base plate 11 rests upon an inwardly presented peripheral ledge 17 on upper regions of said walls 13. Another inwardly presented peripheral ledge or flange 18 is disposed on lower regions of walls 13 and confronts a support frame 19. A flexible and resilient strip 20, preferably of foamed polyurethane, is disposed between and is cemented or otherwise fastened to ledge 18 and support frame 19. The strip provides for resilient support of cabinet 13 on frame 19. A mechanism access cover 21 is fixed by screws S to frame 19, and support pads 33 are provided on the latter.

With further particular reference to FIGS. 1 and 2, manual operating means for the conventional control elements comprise horizontally pivotal levers 22 and 23 that extend through corresponding ones of slots 24 and 25 provided in forward sidewall 13. Levers 22 and 23 are fixed to respective ones of concentric sleeves 26 and 27 journaled by suitable means, such as a pivot shaft 32, on base plate 11. Sleeve 26 operates a crank arm 28 coupled with a tie rod **28*a* operably linked to a conventional on-off-reject mechanism (not shown), and sleeve 27 operates a crank arm 29 provided with a tie rod 29*a*** operably linked to a conventional tone arm cueing mechanism (not shown).

By virtue of the above-described resilient support structure, featured by the foamed polyurethane strip 20 that affords vibrational and hence acoustical isolation of the turntable, there are no relative movements between the operating levers 22 and 23 and the cabinet wall 13. Accordingly forward presentation of the levers is accommodated through relatively narrow slots 24 and 25 in the forward wall 13.

Since the turntable speed is changed only upon changing between records of different speeds, at which time the dust cover 30 is of necessity removed, the speed control operating element may comprise a conventional knob as seen at 31. Further it will be understood that base plate 11 may be of lesser extent than the projected upper area of the cabinet, in which instance a decorative cover could span the uppermost region to present a smooth upper surface.

We claim:

1. Phonograph apparatus comprising: cabinet structure having a horizontally extending upper wall portion, and a sidewall portion depending from the periphery of said upper wall portion; means defining an aperture in said side wall portion; phonograph turntable and record playing mechanism mounted on said upper wall portion; control means for said mechanism carried by said upper wall portion, and including manually operable lever means extending through said aperture in the sidewall portion; means defining a flange extending along the inwardly facing surface of said sidewall portion, and spaced a predetermined distance from the lower edge of the latter; a base frame underlying and coextensive with said flange; and spacer means of flexible and resilient material interposed between said flange and said underlying base frame, in provision of vibration resistant support of said cabinet structure, the thickness of said spacer means being so related to the recited predetermined spacing of said flange that said sidewall portion of the cabinet structure.

2. Apparatus according to claim 1, and further characterized in that said spacer means comprises a strip of foamed polyurethane of generally rectangular cross section and coextensive with said base frame and said flange.

3. Apparatus according to claim 1, and further characterized by the inclusion of a removable dust cover disposed over said upper wall portion, the construction and arrangement of said lever means being such that it provides for operation of said control means while said dust cover is in place.

* * * * *

)-1050
5/69)

UNITED STATES PATENT OFFICE
CERTIFICATE OF CORRECTION

Patent No. 3,638,951 Dated February 1, 1972

Inventor(s) JAMES L. HESS, JR., et al.

It is certified that error appears in the above-identified patent and that said Letters Patent are hereby corrected as shown below:

Column 4, line 5, the words -- spacer means is enclosed by confronting portions of said -- should be inserted before "side wall".

Signed and sealed this 30th day of May 1972.

(SEAL)
Attest:

EDWARD M.FLETCHER, JR.
Attesting Officer

ROBERT GOTTSCHALK
Commissioner of Patents